United States Patent
Ohtani

(10) Patent No.: US 9,048,955 B2
(45) Date of Patent: Jun. 2, 2015

(54) TUNABLE DISPERSION COMPENSATION DEVICE, OPTICAL RECEPTION APPARATUS, AND METHOD FOR CONTROLLING TUNABLE DISPERSION COMPENSATION

(75) Inventor: Toshihiro Ohtani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 458 days.

(21) Appl. No.: 13/488,736

(22) Filed: Jun. 5, 2012

(65) Prior Publication Data
US 2013/0016968 A1 Jan. 17, 2013

(30) Foreign Application Priority Data
Jul. 12, 2011 (JP) ................................. 2011-154277

(51) Int. Cl.
| | |
|---|---|
| H04B 10/00 | (2013.01) |
| H04B 10/08 | (2006.01) |
| H04B 10/12 | (2006.01) |
| H04B 10/18 | (2006.01) |
| H04B 10/2513 | (2013.01) |
| H04B 10/2519 | (2013.01) |
| H04B 10/2525 | (2013.01) |

(52) U.S. Cl.
CPC ...... *H04B 10/25133* (2013.01); *H04B 10/2519* (2013.01); *H04B 10/2513* (2013.01); *H04B 10/2525* (2013.01); *H04B 2210/003* (2013.01)

(58) Field of Classification Search
None
See application file for complete search history.

(56) References Cited

U.S. PATENT DOCUMENTS

| | | | |
|---|---|---|---|
| 2006/0013529 A1 | 1/2006 | Sugawara et al. | |
| 2010/0142951 A1* | 6/2010 | Armstrong et al. | ............. 398/65 |
| 2010/0316392 A1 | 12/2010 | Onaka | |

FOREIGN PATENT DOCUMENTS

| | | |
|---|---|---|
| JP | 2001-320328 | 11/2001 |
| JP | 2006-53519 | 2/2006 |
| JP | 2010-288200 | 12/2010 |

* cited by examiner

*Primary Examiner* — Darren E Wolf
(74) *Attorney, Agent, or Firm* — Staas & Halsey LLP

(57) ABSTRACT

A tunable dispersion compensation device includes a plurality of tunable dispersion compensators coupled in series, a controller configured to control an amount of chromatic dispersion to be set in each of the plurality of tunable dispersion compensators, and a table including a correspondence relationship between an amount of chromatic dispersion and a wavelength band, for each of the plurality of tunable dispersion compensators, wherein the controller decides an amount of chromatic dispersion to be set in each of the plurality of tunable dispersion compensators, based on a total amount of chromatic dispersion desired for the plurality of tunable dispersion compensators and the correspondence relationship included in the table so that a difference between bandwidths of a first tunable dispersion compensator having the widest wavelength band and a second tunable dispersion compensator having the narrowest wavelength band, among the plurality of tunable dispersion compensators, is within a given range.

18 Claims, 14 Drawing Sheets

FIG. 7

| DISPERSION SETTING [ps/nm] | TDC1 | | TDC2 | |
|---|---|---|---|---|
| | EFFECTIVE DISPERSION COMPENSATION BAND [GHz] | 3-dB BAND [GHz] | EFFECTIVE DISPERSION COMPENSATION BAND [GHz] | 3-dB BAND [GHz] |
| −700 | 43.6 | 41.4 | 41.9 | 40.2 |
| −600 | 45.3 | 43.0 | 43.5 | 41.7 |
| −500 | 46.7 | 44.4 | 44.8 | 43.0 |
| −400 | 48.1 | 45.7 | 46.2 | 44.3 |
| −300 | 48.4 | 46.0 | 46.5 | 44.6 |
| −200 | 48.6 | 46.2 | 46.7 | 44.8 |
| −100 | 48.8 | 46.4 | 46.8 | 45.0 |
| 0 | 48.9 | 46.5 | 46.9 | 45.1 |
| 100 | 48.9 | 46.5 | 46.9 | 45.1 |
| 200 | 48.9 | 46.5 | 46.9 | 45.1 |
| 300 | 48.2 | 45.8 | 46.3 | 44.4 |
| 400 | 47.5 | 45.1 | 45.6 | 43.8 |
| 500 | 45.8 | 43.5 | 44.0 | 42.2 |
| 600 | 44.0 | 41.8 | 42.2 | 40.6 |
| 700 | 43.0 | 40.9 | 41.3 | 39.6 |

TUNABLE DISPERSION COMPENSATION DEVICE, OPTICAL RECEPTION APPARATUS, AND METHOD FOR CONTROLLING TUNABLE DISPERSION COMPENSATION

CROSS-REFERENCE TO RELATED APPLICATION

This application is based upon and claims the benefit of priority of the prior Japanese Patent Application No. 2011-154277, filed on Jul. 12, 2011, the entire contents of which are incorporated herein by reference.

FIELD

The embodiments discussed herein are related to tunable dispersion compensation devices, optical reception apparatuses, and methods for controlling tunable dispersion compensation.

BACKGROUND

When long-distance transmission is performed using wavelength division multiplexing (WDM), a dispersion compensating fiber is generally arranged at each repeater station and a receiver station to perform correction for cancelling an amount of chromatic dispersion received during the preceding transmission so that a light signal may be received successfully and, in addition, a tunable dispersion compensator (TDC) is generally arranged in front of a receiver module to perform optimum dispersion compensation on each channel.

However, since individual wavelength-division multiplexed channels receive different amounts of dispersion from a transmission path, a difference or variance is caused in an amount of residual dispersion (amount of accumulated dispersion) between the channels even if dispersion compensation is performed at repeater stations. This difference or variance increases in proportion to the transmission distance.

FIG. 1 is a diagram illustrating dispersion compensation and residual dispersion in WDM transmission. Different amounts of dispersion are accumulated for individual wavelengths in each transmission path. The longer the wavelength of a channel, the more easily the channel is affected by dispersion and the greater the amount of residual dispersion (arrow A). The amount of chromatic dispersion is decreased at each repeater station by using a dispersion compensating fiber (arrow B). However, since the amount of accumulated dispersion and the amount of compensation differ depending on the wavelength, it is difficult to return the amounts of residual dispersion of all channels to zero (arrow C).

Since different amounts of dispersion compensation are desirably applied to individual signal wavelengths at a receiver station, a tunable dispersion compensator (TDC) is arranged on the reception side. In order to support a range between the maximum value and the minimum value of the amounts of compensation of all channels by using one TDC, a chromatic dispersion compensation range of the TDC is desirably made wide (arrow D). However, an amount of tunable chromatic dispersion and the bandwidth of an effective dispersion compensation band of a TDC have a tradeoff relationship as illustrated in FIG. 2.

As illustrated in FIG. 3A, the effective dispersion compensation band indicates a band within which an amount of dispersion has linearity, and is generally defined as a wavelength range within which the ripple or slope of group delay is smaller than or equal to a given value. On the other hand, as illustrated in FIG. 3B, a transmission band is defined as a wavelength range by points which are lower than the minimum loss value (peak value) by, for example, 3 dB.

Referring to FIG. 2, when the effective dispersion compensation band is widened, the tunable range of the amount of dispersion compensation narrows (arrow D). When the tunable range is widened, the effective dispersion compensation band narrows (arrow E). Accordingly, it is difficult to achieve both a wide effective wavelength band and a large amount of tunable dispersion compensation by using one device.

As illustrated by arrow F in FIG. 4A, the slope in the range of the effective dispersion compensation band where the linearity is maintained corresponds to an amount of chromatic dispersion. In this linearity-maintained range, a uniform amount of chromatic dispersion compensation is applicable. The same amount of dispersion compensation is not applicable to all signal spectrum components unless both the effective dispersion compensation band and the transmission band are wider than spectrum width of signal light. If the effective dispersion compensation band is not wide enough, transmission penalties are caused by deterioration of the signal waveform as illustrated by arrow G in FIG. 4B. Accordingly, dispersion compensation is reliably performed based on narrower one of the effective dispersion compensation band and the transmission band.

To perform dispersion compensation on an approximately 40-GHz signal, a band of approximately 50 GHz is desirably obtained. However, it is difficult to support an amount of dispersion compensation of ±1000 ps/nm after obtaining this band. For this reason, a general TDC has an amount of tunable dispersion compensation of approximately ±700 ps/nm.

A configuration has been proposed in which two TDCs are coupled in series in order to obtain a desired dispersion compensation band (e.g., Japanese Laid-open Patent Publication No. 2010-288200). In this configuration, a second TDC is cascade coupled in order to compensate for the shortage of the dispersion compensation band of a first TDC. The total amount of tunable dispersion compensation may be increased by coupling multiple TDCs in series. However, the band may undesirably narrow depending on the way of control, and as a result the transmission quality may decrease.

In addition, a configuration is known in which optical dispersion compensation elements are coupled in series in upstream of a stage where wavelength demultiplexing is performed on the reception side, in order to compensate for the third-order dispersion for entire transmission signal light (e.g., Japanese Laid-open Patent Publication No. 2001-320328).

Furthermore, a configuration has bee proposed which realizes a dispersion compensation device having a wide band and a few ripple by coupling multiple TDCs in each of which an etalon and a mirror are arranged at a given angle (e.g., Japanese Laid-open Patent Publication No. 2006-053519).

FIGS. 5A and 5B are diagrams for describing characteristic differences resulting from different TDC combinations. For example, when an amount of dispersion compensation of ±800 ps/nm is applied in total by coupling two TDCs each having a tunable dispersion wavelength characteristic of ±700 ps/nm, following example combinations are possible. Although there are an infinite number of combinations, two examples will be illustrated herein for convenience.

+700 ps/nm(TDC 1)+100 ps/nm(TDC 2)=+800 ps/nm
(FIG. 5A)                                                                    Method 1

+400 ps/nm(TDC 1)+400 ps/nm(TDC 2)=+800 ps/nm
(FIG. 5B)                                                                    Method 2

In the method 1, a large dispersion value (+700 ps/nm) is set for one of the TDCs as illustrated in FIG. 5A. The effective dispersion compensation band of the TDC having the large dispersion value is narrow. When the two TDCs are coupled in series, the characteristic of the entire device is affected by the characteristic of the TDC having the narrower band. As a result, the effective bandwidth of the entire device narrows.

On the other hand, when two TDCs each having a dispersion value of +400 ps/nm are coupled, both of the TDCs have substantially even effective dispersion compensation bands as illustrated in FIG. 5B. Each TDC has the band that is narrower than the effective dispersion compensation band corresponding to +100 ps/nm but that is wider than the effective dispersion compensation band corresponding to +700 ps/nm. When the two TDCs are coupled, a band that is wider than the band obtained by the combination illustrated in FIG. 5A may be obtained as a whole.

SUMMARY

According to an aspect of the invention, a tunable dispersion compensation device includes a plurality of tunable dispersion compensators coupled in series, a controller configured to control an amount of chromatic dispersion to be set in each of the plurality of tunable dispersion compensators, and a table including a correspondence relationship between an amount of chromatic dispersion and a wavelength band, for each of the plurality of tunable dispersion compensators, wherein the controller decides an amount of chromatic dispersion to be set in each of the plurality of tunable dispersion compensators, based on a total amount of chromatic dispersion desired for the plurality of tunable dispersion compensators and the correspondence relationship included in the table so that a difference between bandwidths of a first tunable dispersion compensator having the widest wavelength band and a second tunable dispersion compensator having the narrowest wavelength band, among the plurality of tunable dispersion compensators, is within a given range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of a stored TDC control table.

DESCRIPTION OF EMBODIMENTS

Embodiments will be illustrated below with reference to the accompanying drawings. In the embodiments, when multiple tunable chromatic dispersion compensators (hereinafter, appropriately referred to as "TDCs") are used in combination, appropriate amounts of chromatic dispersion are set in the TDCs on the basis of characteristics (e.g., a relationship between a set amount of chromatic dispersion and an effective band) according to individual differences of the TDCs so that the desirable characteristic is obtained as a whole. In this way, a large amount of chromatic dispersion is handled and a wide bandwidth is ensured.

Figure 6:
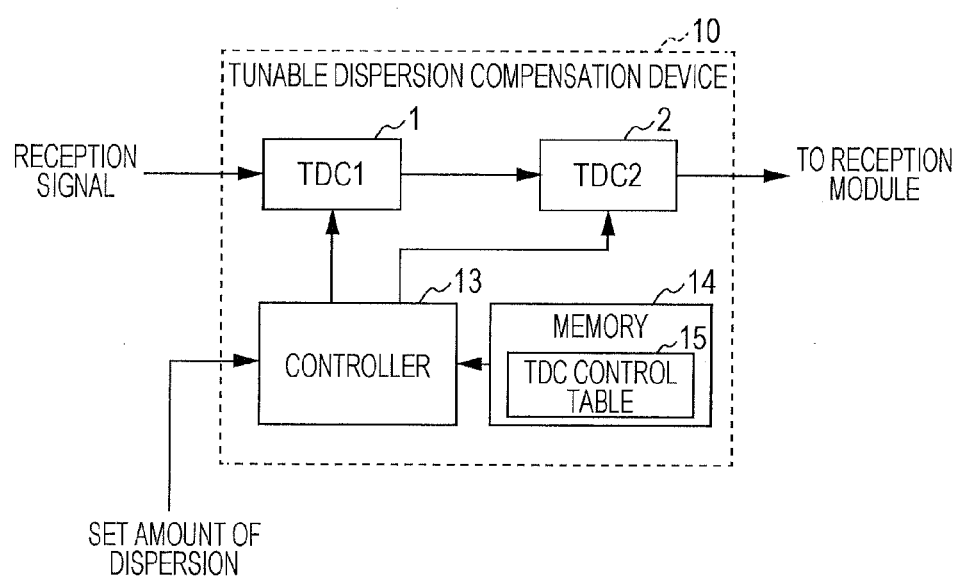
FIG. 6 illustrates an example of a configuration of a tunable dispersion compensation device according to an embodiment.

FIG. 6 is a diagram illustrating an example of a configuration of a tunable dispersion compensation device 10 according to an embodiment. The tunable dispersion compensation device 10 includes a first TDC 1, a second TDC 2, a controller 13, and a memory 14. The first TDC 1 and the second TDC 2 are coupled in series. A light signal (reception signal) that has propagated through an optical transmission path is input to the first TDC 1 and then to the second TDC 2.

The first TDC 1 and the second TDC 2 are configured using optical devices, e.g., fiber Bragg gratings (FBGs), virtually imaged phased array (VIPAs), planar lightwave circuits (PLCs), or etalons. In addition to when different amounts of dispersion compensation are set in the first TDC 1 and the second TDC 2, even when the same amount of dispersion compensation is set in the first TDC 1 and the second TDC 2, effective dispersion compensation bands and transmission bands thereof differ because of manufacturing tolerances or the like.

The controller 13 receives a setting regarding a desired total amount of chromatic dispersion, and separately sets optimum amounts of dispersion in the first TDC 1 and the second TDC 2. As illustrated later, the total amount of dispersion may be set by using a set value input from the outside by a service provider or a device user, or may be set by the controller 13 on the basis of error information of a reception signal. The memory 14 pre-stores a TDC control table 15, in which relationships between a set amount of dispersion and bands (the effective dispersion compensation band and the transmission band in the embodiment) are pre-registered for each TDC. Meanwhile, the TDC control table 15 may be configured as a list format using pointers.

The controller 13 may be implemented by, for example, a digital signal processor (DSP). Alternatively, the controller 13 may be implemented by, for example, a general-purpose processor or by a circuit providing functions equivalent to those of a DSP, such as a field-programmable gate array (FPGA) or an application specific integrated circuit (ASIC).

FIG. 7 is a diagram illustrating an example of the TDC control table 15 stored in the memory 14. In the embodiment, it is assumed that both the first TDC 1 and the second TDC 2 have an amount of tunable dispersion compensation of ±700 ps/nm, and a dispersion compensation value is settable within this range. In the TDC control table 15 illustrated in FIG. 7, measured values of the effective dispersion compensation band and of the transmission band (a band defined by points lower than the peak by 3 dB and hereinafter abbreviated as "3-dB band") which correspond to the set dispersion value are recorded for each of the first TDC 1 and the second TDC 2 in steps of 100 ps/nm. The measured values may be acquired during manufacture of the first TDC 1 and the second TDC 2, for example. From a standpoint of manufacturing cost of the TDCs and the capacity of the memory 14, a measurement in fine steps (e.g., in steps of 10 ps/nm or smaller) is undesirable. It is reasonable to perform the measurement in steps of approximately 50 to 100 ps/nm. During control, a calculation for interpolating the values in the TDC control table 15 is performed using a given interpolation method, such as spline interpolation or Lagrange interpolation.

Herein, a case will be discussed in which 800 ps/nm is set as the total amount of dispersion. When two TDCs are used, there are an infinite number of combinations regarding distribution of the amount of tunable dispersion, such as 300 ps/nm and 500 ps/nm. However, as in the related art, a method (method 1) in which the amount of dispersion +700 ps/nm, which is the upper limit of the first TDC 1, is controlled by the first TDC 1 and the remaining amount of dispersion is corrected by the second TDC 2 is compared with a method (method 2) in which the amount of dispersion is set in consideration of the characteristic of each TDC according to the embodiment.

+700 ps/nm(TDC 1)+100 ps/nm(TDC 2)=total+800 ps/nm     Method 1

+400 ps/nm(TDC 1)+400 ps/nm(TDC 2)=total+800 ps/nm     Method 2

In the TDC control table 15 illustrated in FIG. 7, a combination enclosed by a solid line corresponds to the method 1, whereas a combination enclosed by a broken line corresponds to the method 2. Narrower one of the effective dispersion compensation band and the transmission band (3-dB band) is set as a band corresponding to the set dispersion value.

The bandwidth of the first TDC 1 is equal to 40.9 GHz when the amount of dispersion +700 ps/nm is set, and is equal to 45.1 GHz when the amount of dispersion +400 ps/nm is set.

The bandwidth of the second TDC 2 is equal to 45.1 GHz when the amount of dispersion +100 ps/nm is set, and is equal to 43.8 GHz when the amount of dispersion +400 ps/nm is set.

The bandwidth corresponding to the total amount of dispersion, i.e., +800 ps/nm, in the methods 1 and 2 is the narrower one of the bandwidths of the first TDC 1 and the second TDC 2. Accordingly, the bandwidth in the method 1 is equal to 40.9 GHz, whereas the bandwidth in the method 2 is equal to 43.8 GHz. As illustrated above, even for the same total amount of dispersion, the bandwidth varies depending on the way of control.

Accordingly, the controller 13 of the tunable dispersion compensation device 10 according to the embodiment calculates amounts of dispersion to be set in the first TDC 1 and the second TDC 2 on the basis of the TDC control table 15 so that the two TDCs 1 and 2 have substantially even bandwidths and the total characteristic becomes desirable.

Figure 8:
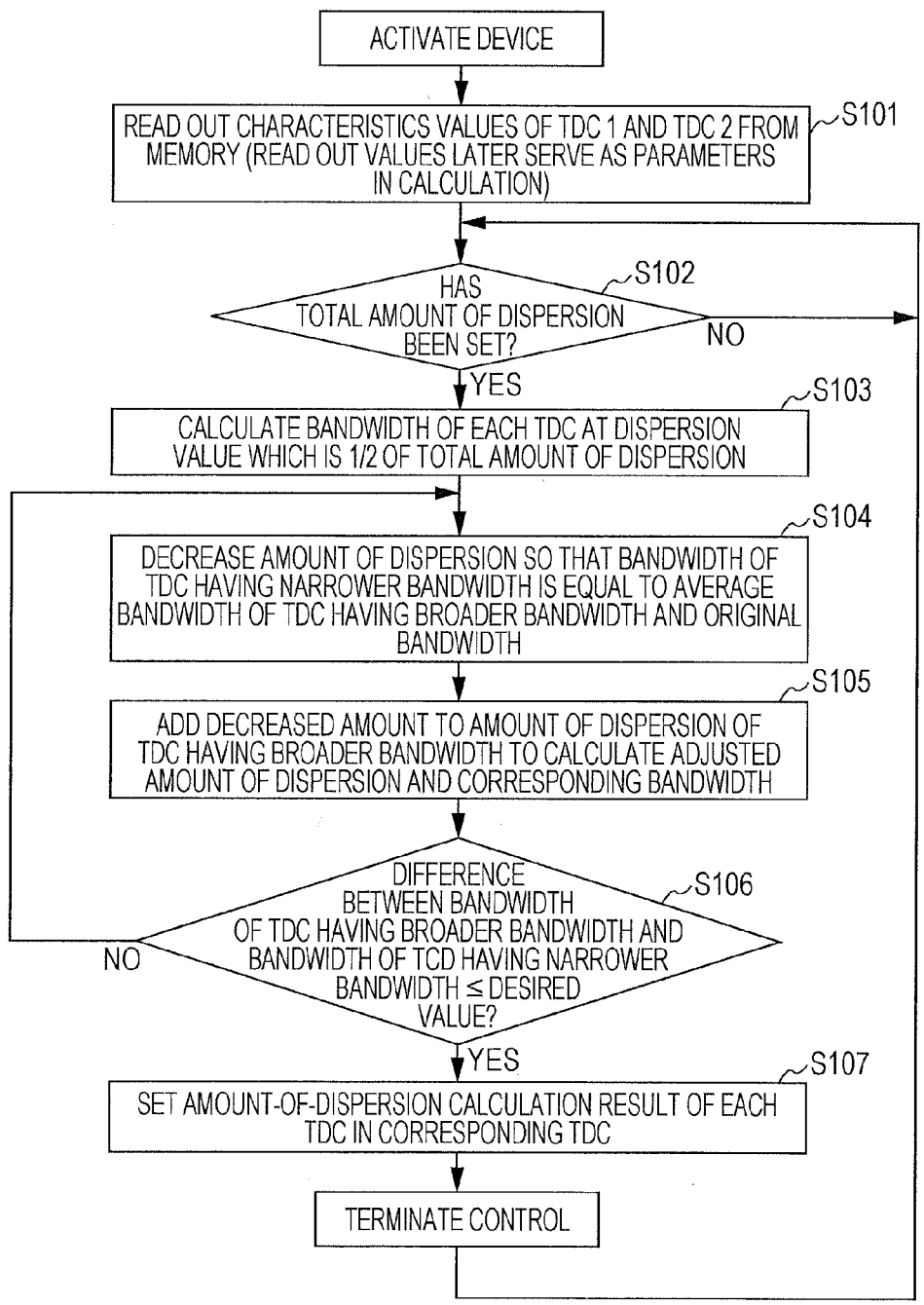
FIG. 8 illustrates a control method performed when two TDCs are coupled.

FIG. 8 is a diagram illustrating a control flow performed when two TDCs are coupled in series. In this example, the total amount of dispersion +800 ps/nm is distributed to the two TDCs 1 and 2 so that a difference between the bandwidths of the first TDC 1 and the second TDC 2 is within 0.1 GHz.

After activation of the tunable dispersion compensation device 10, the controller 13 reads out values of characteristics of the first TDC 1 and the second TDC 2 from the memory 14 (reference S101). The read out values later serve as parameters in calculations. In reference S102 (hereinafter, "reference" may be omitted), the controller 13 determines whether or not the total amount of dispersion has been set. The controller 13 stands by until the total amount of dispersion is set. The total amount of dispersion may be set based on an input supplied from the outside or by the controller 13 based on feedback information. When the total amount of dispersion (e.g., +800 ps/nm) has been set (YES in S102), the process proceeds to S103.

In S103, the controller 13 calculates a bandwidth of each TDC at a dispersion value which is ½ of the total amount of dispersion, and the average (or center) of these bandwidths. In this example, bandwidths of the first TDC 1 and the second TDC 2 obtained when +400 ps/nm is distributed to each of the first TDC 1 and the second TDC 2 are determined. With reference to the TDC control table 15 illustrated in FIG. 7, following bandwidths are determined.

45.1 GHz at 400 ps/nm (wider band)     TDC 1

43.8 GHz at 400 ps/nm (narrower band)     TDC 2

Here, for each TDC, narrower one of the effective dispersion compensation bandwidth and the 3-dB bandwidth is selected.

In S104, the controller 13 determines the average of the bandwidths of the two TDCs 1 and 2. In this example, the center (average) of the two bandwidths is calculated as follows: (45.1+43.8)/2=44.45 GHz.

Then, the controller 13 increases the bandwidth of the second TDC 2 having the narrower band to the bandwidth 44.45 GHz which is the middle of the bandwidths of the first and second TDCs 1 and 2, and calculates the corresponding amount of dispersion of the second TDC 2. Referring to the TDC control table 15, the bandwidth of the second TDC 2 becomes equal to 44.45 GHz when the dispersion value is between 200 ps/nm and 300 ps/nm. The controller 13 performs linear approximation on the two points, i.e., the dispersion values 200 ps/nm and 300 ps/nm, and determines an intermediate value. When the bandwidth of the second TDC 2 becomes equal to 44.45 GHz, the corresponding amount of dispersion is equal to 293 ps/nm. The dispersion value corresponding to the bandwidth of the second TDC 2 may be determined using other appropriate interpolation methods.

44.45 GHz at 293 ps/nm     TDC 2

In order to cover the amount of dispersion +800 ps/nm in total, an amount of dispersion decreased in the second TDC 2 having the narrower band is compensated for by the first TDC 1.

In S105, the amount of dispersion decreased in the second TDC 2 is added to the amount of dispersion of the first TDC 1 having the wider band so that the amount of dispersion +800 ps/nm is covered in total. Then, the controller 13 calculates the adjusted amount of dispersion of the first TDC 1 and the corresponding bandwidth of the first TDC 1.

400+(400−293)=507 ps/nm     TDC 1

The controller 13 performs a calculation using an interpolation method (e.g., the aforementioned linear interposition) with reference to the TDC control table 15, thereby determining that the bandwidth of the first TDC 1 which corresponds to the amount of dispersion 507 ps/nm is equal to 43.38 GHz.

43.38 GHz at 507 ps/nm     TDC 1

At this point, the band of the second TDC 2 is wider than the band of the first TDC 1. In S106, the controller 13 determines whether or not the difference between the bandwidths of the first and second TDCs 1 and 2 is smaller than or equal to a given value, e.g., 0.1 GHz. When the difference is greater than the given value (NO in S106), the process returns to S104 and the calculations are repeated.

In this example, the difference between the bandwidths of the first and second TDCs 1 and 2 is equal to 1.07 GHz (44.45 GHz−43.38 GHz), and has not yet converged within the given bandwidth-difference range, i.e., 0.1 GHz. Accordingly, the process returns to S104 and the calculations are continued.

At the start of the second round, the values are set as follows.

43.38 GHz at 507 ps/nm (narrower band) TDC 1

44.45 GHz at 293 ps/nm (wider band) TDC 2

The average of the bandwidths of the two TDCs 1 and 2 are calculated as follows: (43.38+44.45)/2=43.92 GHz. The controller 13 increases the bandwidth of the first TDC 1 having the narrower band to the center (average) bandwidth 43.92 GHz, and calculates the corresponding amount of dispersion.

43.92 GHz at 474 ps/nm (S104) TDC 1

The amount of dispersion decreased in the first TDC 1 is compensated for by the second TDC 2. The controller 13 calculates the resulting amount of dispersion and the corresponding bandwidth of the second TDC 2 (S105).

44.24 GHz at 293+(507−474)=326 ps/nm TDC 2

The difference between the bandwidths of the first and second TDCs 1 and 2 is calculated as: 44.24−43.92=0.32 GHz, which has not yet converged within the given range (NO in S106). Accordingly, S104 to 5106 are repeated.

At the start of the third round, the values are set as follows.

43.92 GHz at 474 ps/nm (narrower band) TDC 1

44.24 GHz at 326 ps/nm (wider band) TDC 2

The average of the bandwidths is calculated as follows: (43.92+44.24)/2=44.08 GHz. The controller 13 increases the bandwidth of the first TDC 1 having the narrower band to the center (average) bandwidth 44.08 GHz, and calculates the corresponding amount of dispersion.

44.08 GHz at 464 ps/nm (S104) TDC 1

The amount of dispersion decreased in the first TDC 1 is compensated for by the second TDC 2. The controller 13 calculates the resulting amount of dispersion and the corresponding bandwidth of the second TDC 2 (S105).

44.18 GHz at 326+(474−464)=336 ps/nm. TDC 2

The difference between the bandwidths of the first and second TDCs 1 and 2 at this point is calculated as: 44.18-44.08=0.1 GHz, which has converged within the given range (YES in S106). Accordingly, these amounts of dispersion are set in the first TDC 1 and the second TDC 2 in S107.

44.08 GHz at 464 ps/nm TDC 1

44.18 GHz at 336 ps/nm TDC 2

In this way, the amount of tunable dispersion, i.e., 800 ps/nm, is covered in total, and the bandwidth of the whole tunable dispersion compensation device 10 in this case is equal to 44.08 GHz. That is, a wide band may be obtained while maintaining a desired amount of tunable dispersion.

The calculations performed above are summarized as follows.

<Operation 1>

A bandwidth obtained when ½ of the total amount of dispersion is distributed to each of the first and second TDCs 1 and 2 is calculated.

TDC 1(400 ps/nm,45.1 GHz)+TDC 2(400 ps/nm,43.8 GHz)

The average of the bandwidths is equal to 44.45 GHz.

<Operation 2>

The amount of dispersion obtained when the bandwidth of the second TDC 2 having the narrower band becomes equal to the average 44.45 GHz, and the amount of dispersion and the bandwidth of the first TDC 1 at that point are calculated.

TDC 1(507 ps/nm,43.38 GHz)+TDC 2(293 ps/nm, 44.45 GHz)

The average of the bandwidths is equal to 43.92 GHz.

<Operation 3>

The amount of dispersion obtained when the bandwidth of the first TDC 1 having the narrower band becomes equal to the average 43.92 GHz, and the amount of dispersion and the bandwidth of the second TDC 2 at that point are calculated.

TDC 1(474 ps/nm,43.92 GHz)+TDC 2(326 ps/nm, 44.24 GHz)

The average of the bandwidths is equal to 44.08 GHz

<Operation 4>

The amount of dispersion obtained when the bandwidth of the first TDC 1 having the narrower band becomes equal to the average 44.08 GHz, and the amount of dispersion and the bandwidth of the second TDC 2 at that point are calculated.

TDC 1(464 ps/nm,44.08 GHz)+TDC 2(336 ps/nm, 44.18 GHz)

At this point, the difference between the bandwidths has converged within the given range (optimum amounts of dispersion are obtained).

In the foregoing example, the difference between the bandwidths (convergence range) that serves as a calculation termination reference value is set equal to 0.1 GHz. However, a given value may be set depending on the design margin regarding the actual characteristics of the TDCs, the spectrum width of the signal, the amount of wavelength variation, and so forth. For example, a coarse value (e.g., 10 GHz) may be set for a 10-Gbps signal having a narrow spectrum width. However, the difference between the bandwidths is desirably set to be smaller than or equal to 1 GHz for a signal having a wide spectrum width, such as a 40-Gbps differential phase shift keying (DPSK) signal.

This bandwidth-difference convergence reference value may be set to a fixed value by default, or may be set from the outside at any time in accordance with a signal rate to be used (such as 40 Gbps or 10 Gbps) or a signal modulation format (such as DPSK or differential quadrature phase shift keying (DQSPK)).

Figure 9:
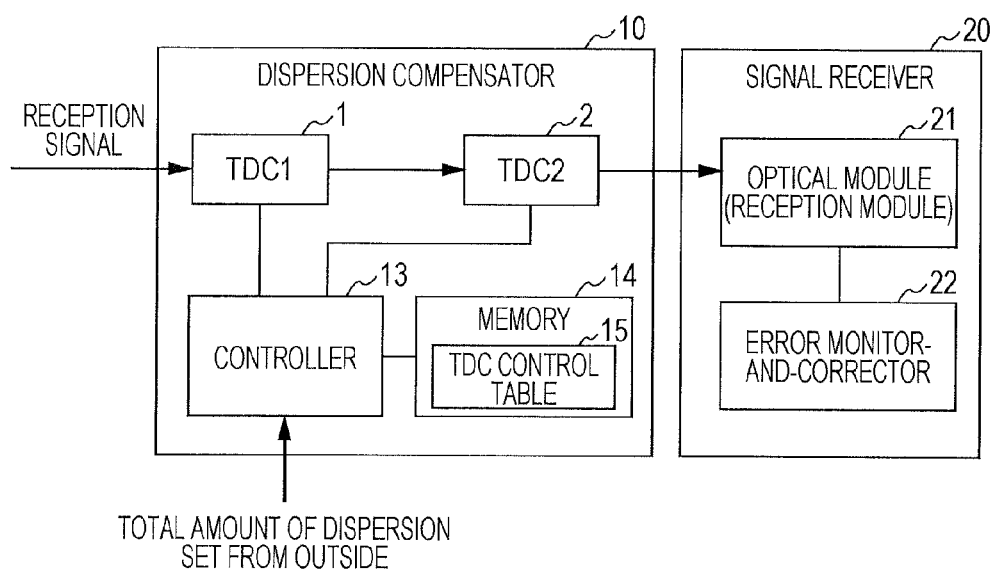
FIG. 9 illustrates an example of a configuration of an optical reception apparatus.

FIG. 9 is a schematic configuration diagram of an optical reception apparatus 30A in which the tunable dispersion compensation device 10 according to the embodiment is used. The optical reception apparatus 30A includes a dispersion compensator 10 that compensates for an amount of chromatic dispersion caused in each channel of a received light signal, and a signal receiver 20. The dispersion compensator 10 corresponds to the tunable dispersion compensation device 10 that has been illustrated with reference FIGS. 6 to 8.

Light output from the dispersion compensator 10, which ensures a wide tunable dispersion compensation range and a wide bandwidth, is input to the signal receiver 20. The signal receiver 20 includes an optical module (reception module)

21, and an error monitor-and-corrector 22. The optical module 21 includes a photodiode and an amplifier, and converts the input light signal into an electric signal. The error monitor-and-corrector 22 performs forward error correction (FEC) decoding on an FEC-encoded transmission signal, and corrects errors of the signal. The signal resulting from photoelectric conversion and error correction is transmitted to each distribution destination.

In the optical reception apparatus 30A illustrated in FIG. 9, the set total dispersion value is input to the dispersion compensator 10 from the outside. In this case, it is assumed that the dispersion value of the transmission path is examined in advance and the optimum amount of dispersion is known. The controller 13 of the dispersion compensator 10 executes the control method illustrated in FIG. 8 on the basis of the input total dispersion value, and decides an optimum amount of dispersion for each of the first and second TDCs 1 and 2.

Figure 10:
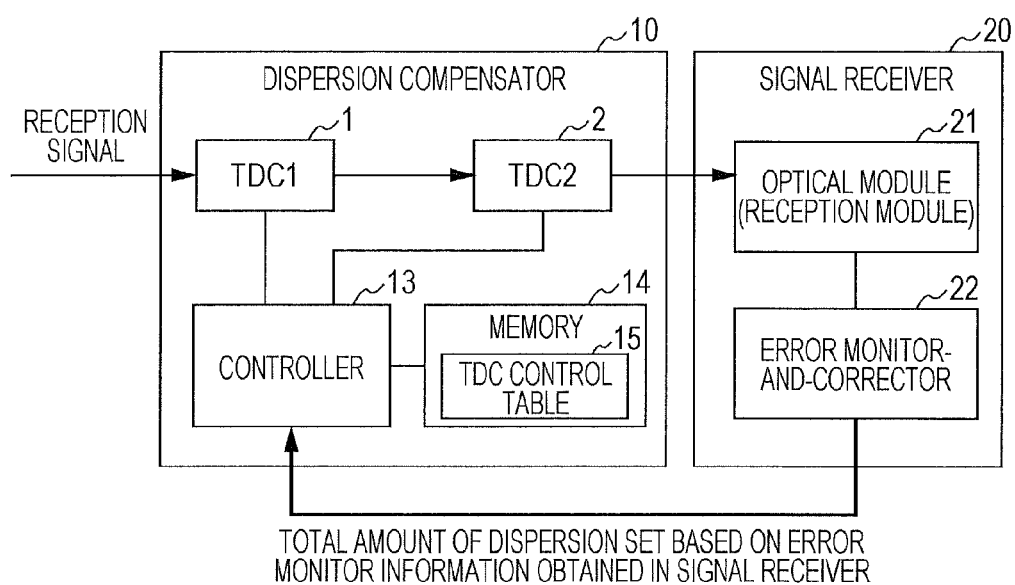
FIG. 10 illustrates another example of the configuration of the optical reception apparatus.

FIG. 10 illustrates a schematic configuration of an optical reception apparatus 30B as another configuration example of the optical reception apparatus. In the configuration illustrated in FIG. 10, the error monitor-and-corrector 22 of the signal receiver 20 feeds error monitor information (e.g., a bit error rate) back to the controller 13 of the dispersion compensator 10. The controller 13 sets the optimum total dispersion value from the error monitor information. The error monitor information is fed back periodically, e.g., at intervals of several hours. With this configuration, an amount of dispersion compensation desired for each TDC may be optimized in accordance with the transmission quality.

Figure 11:
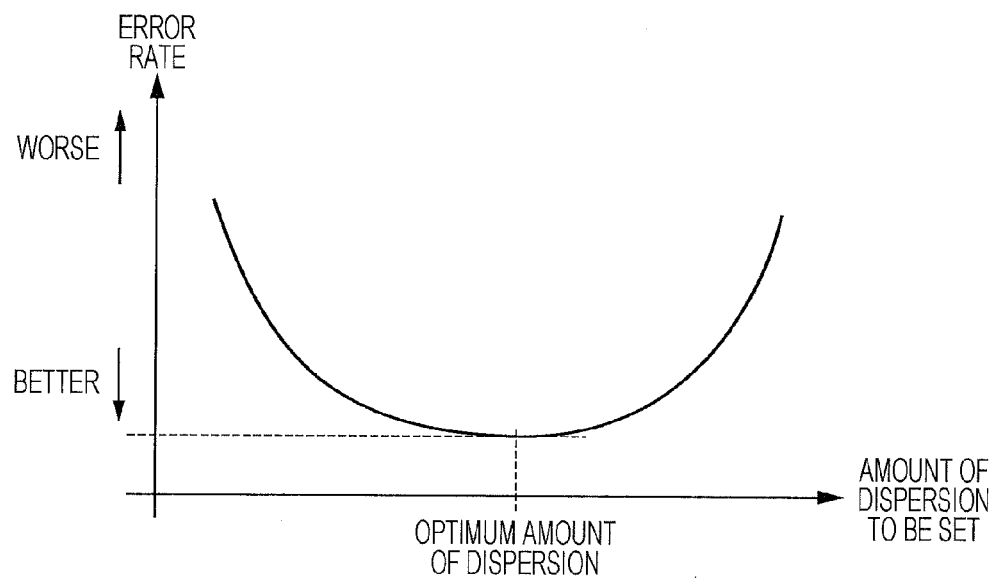
FIG. 11 illustrates a relationship between a dispersion value to be set and an error rate.

FIG. 11 is a graph illustrating a relationship between the dispersion value to be set and the error rate. The dispersion value that gives the smallest error rate is selected as the optimum total dispersion value. Since two TDCs are coupled in series in the embodiment, there are some methods for determining the optimum amounts of dispersion for such a configuration.

In a first method, the total amount of dispersion is divided by the number of TDCs and is evenly distributed to each TDC at the beginning of the processing flow illustrated in FIG. 8. The optimum total amount of dispersion is determined with the distributed amounts of dispersion being fixed. Then, the amount of dispersion distributed to each TDC is determined. Since two TDCs are used in the embodiment, ½ of the total amount of dispersion is roughly distributed to each TDC. The optimum total amount of dispersion (an amount of dispersion corresponding to a minimum) is determined with these distributed amounts of dispersion being fixed. Then, a fine amount of dispersion to be distributed to each TDC is determined. In another method, a value set for each TDC is determined every time one total amount of dispersion is set.

FIG. 8 illustrates the control flow that starts from activation of the tunable dispersion compensation device 10. In fine adjustment during operation performed after the calculations are finished and the optimum dispersion value is set in each TDC, the processing flow may be desirably started from the middle. This is because, in the case where the dispersion values are finely adjusted during operation, the dispersion values may deviate from the optimum state if the flow is started from the beginning and the deviation may affect the transmission quality.

Accordingly, when fine adjustment is desired during operation, the total amount of dispersion is desirably set to a desired value with a ratio between the currently set dispersion values being maintained. For example, the optimum total amount of dispersion is changed to 1000 ps/nm on the basis of the error monitor information in a state where the total amount of dispersion 800 ps/nm, and the dispersion values 464 ps/nm and 336 ps/nm are set in the first and second TDCs 1 and 2, respectively, in the flow illustrated in FIG. 8, the dispersion values are set in a following manner.

$$464 \times 1000/800 = 580 \text{ ps/nm} \qquad \text{TDC 1}$$

$$336 \times 1000/800 = 420 \text{ ps/nm} \qquad \text{TDC 2}$$

Since changes in the optimum points occur within an error margin, the set distribution ratio may be maintained.

When a TDC is configured using an FBG, the amount of chromatic dispersion may be altered by changing temperature of the fiber or changing stress applied to the fiber so as to change a pitch between Bragg gratings in the fiber. When a TDC is configured using a VIPA, the amount of chromatic dispersion may be altered by changing a position of a three-dimensional mirror that returns, to the VIPA, light emitted in a direction corresponding to the wavelength from the VIPA so as to change an optical path length for each wavelength. In either case, the amount of dispersion may be altered by inputting a control signal output from the controller 13 into a driver not illustrated.

Figure 1:
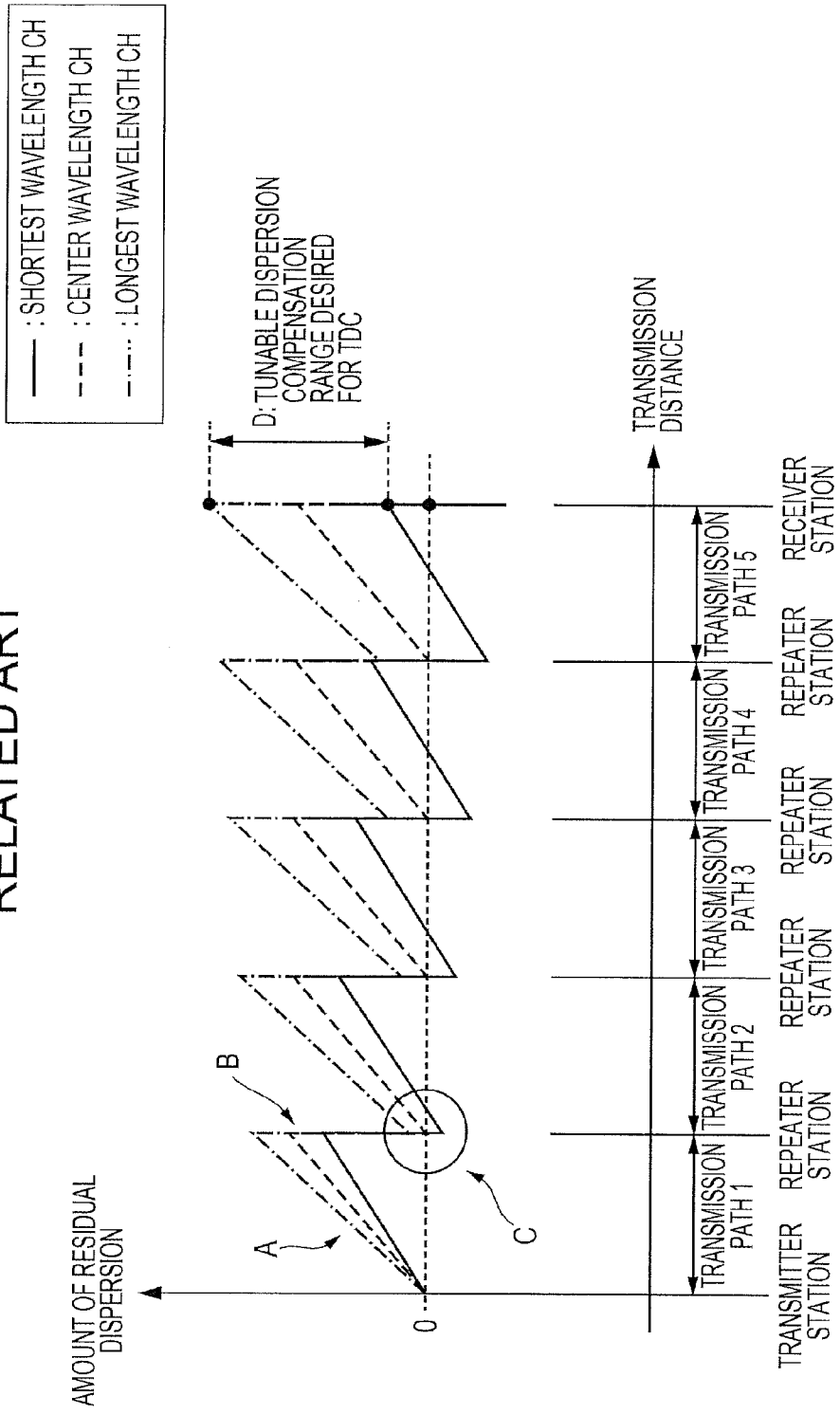
FIG. 1 illustrates dispersion compensation and residual dispersion in wavelength division multiplexing (WDM) transmission.
Figure 2:
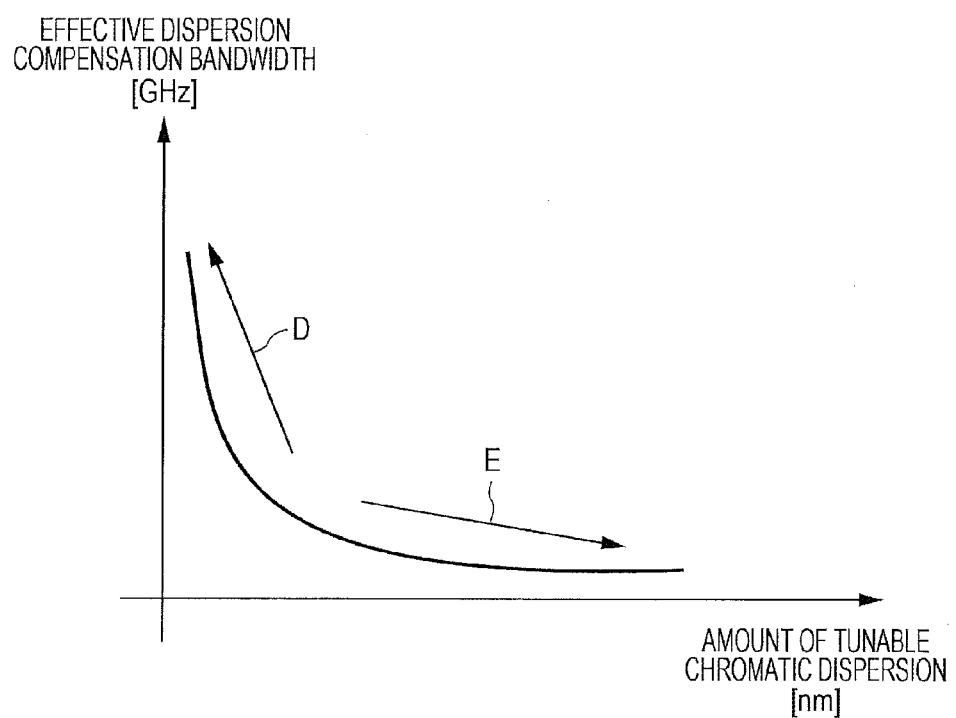
FIG. 2 is a graph describing a tradeoff relationship between an amount of tunable chromatic dispersion and an effective dispersion compensation bandwidth.
Figure 3A:
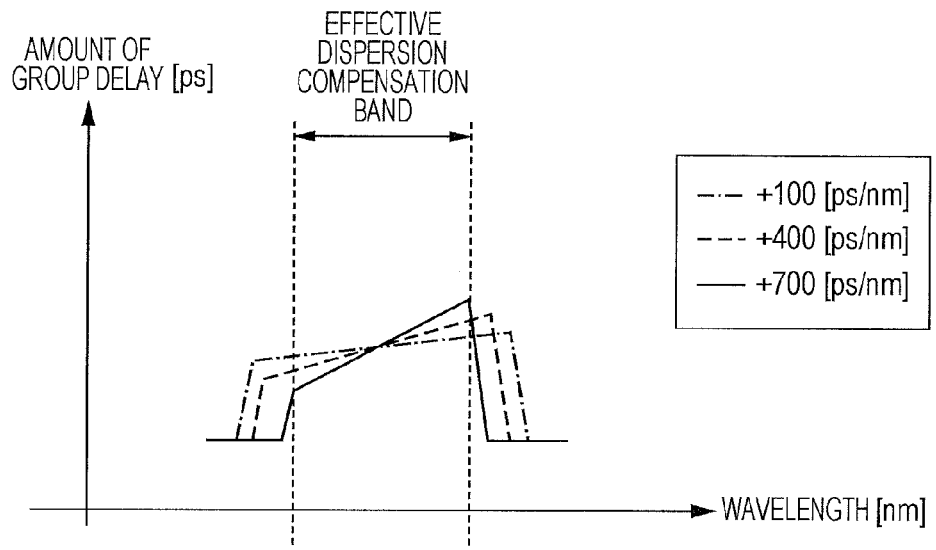
FIGS. 3A and 3B illustrate example characteristics of a tunable dispersion compensator (TDC).
Figure 3B:
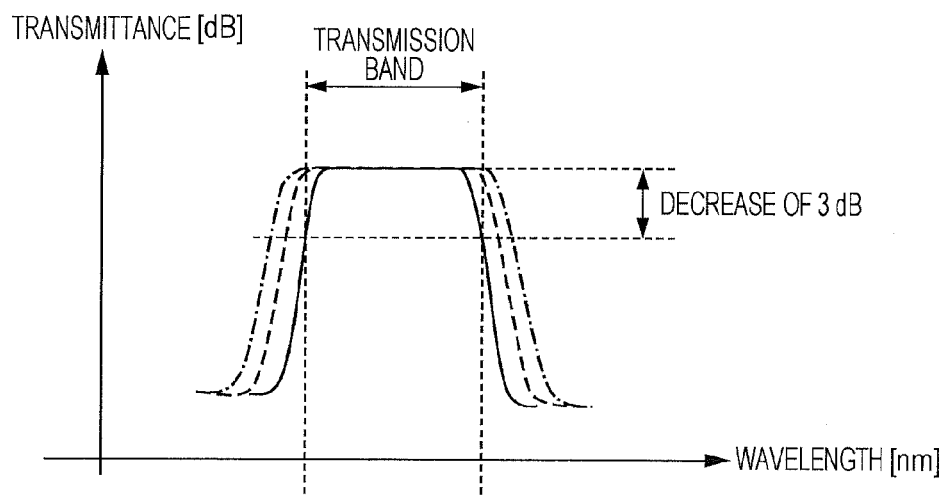
Figure 4A:
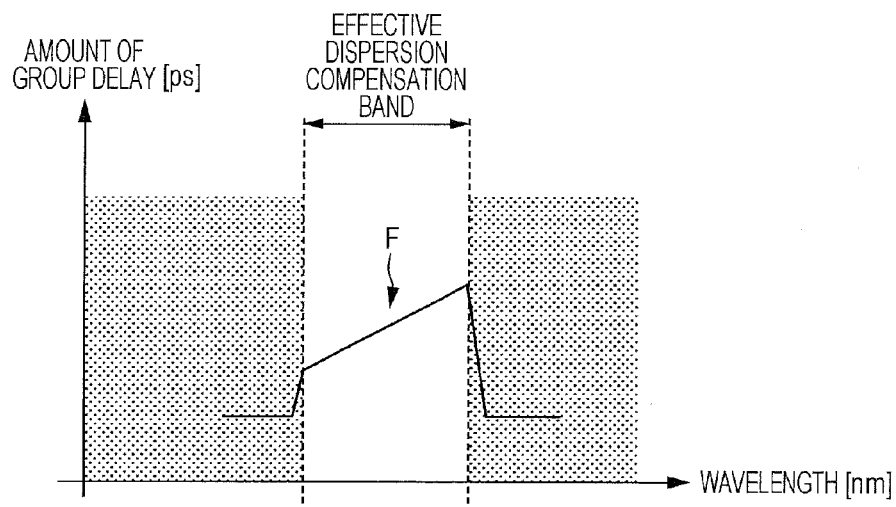
FIGS. 4A and 4B illustrate an example of a tradeoff between characteristics that may be realized by a single TDC.
Figure 4B:
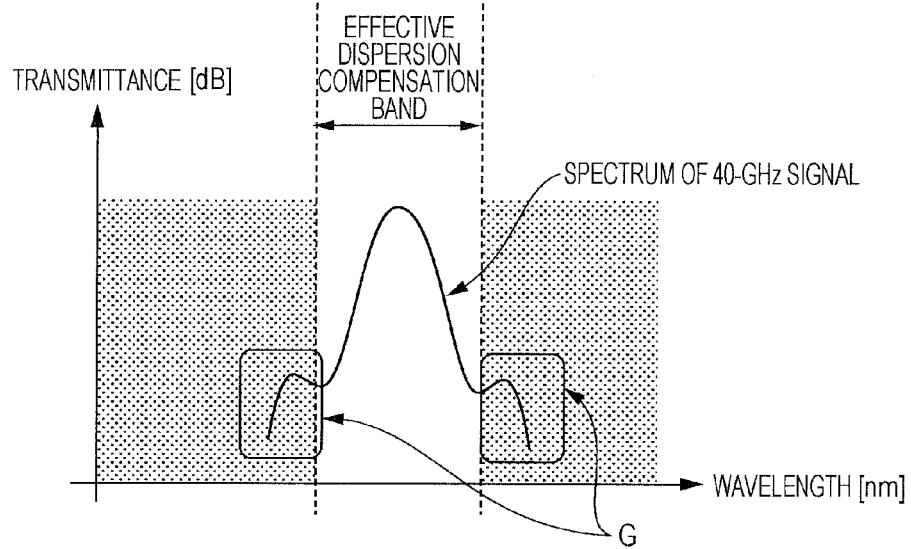
Figure 5A:
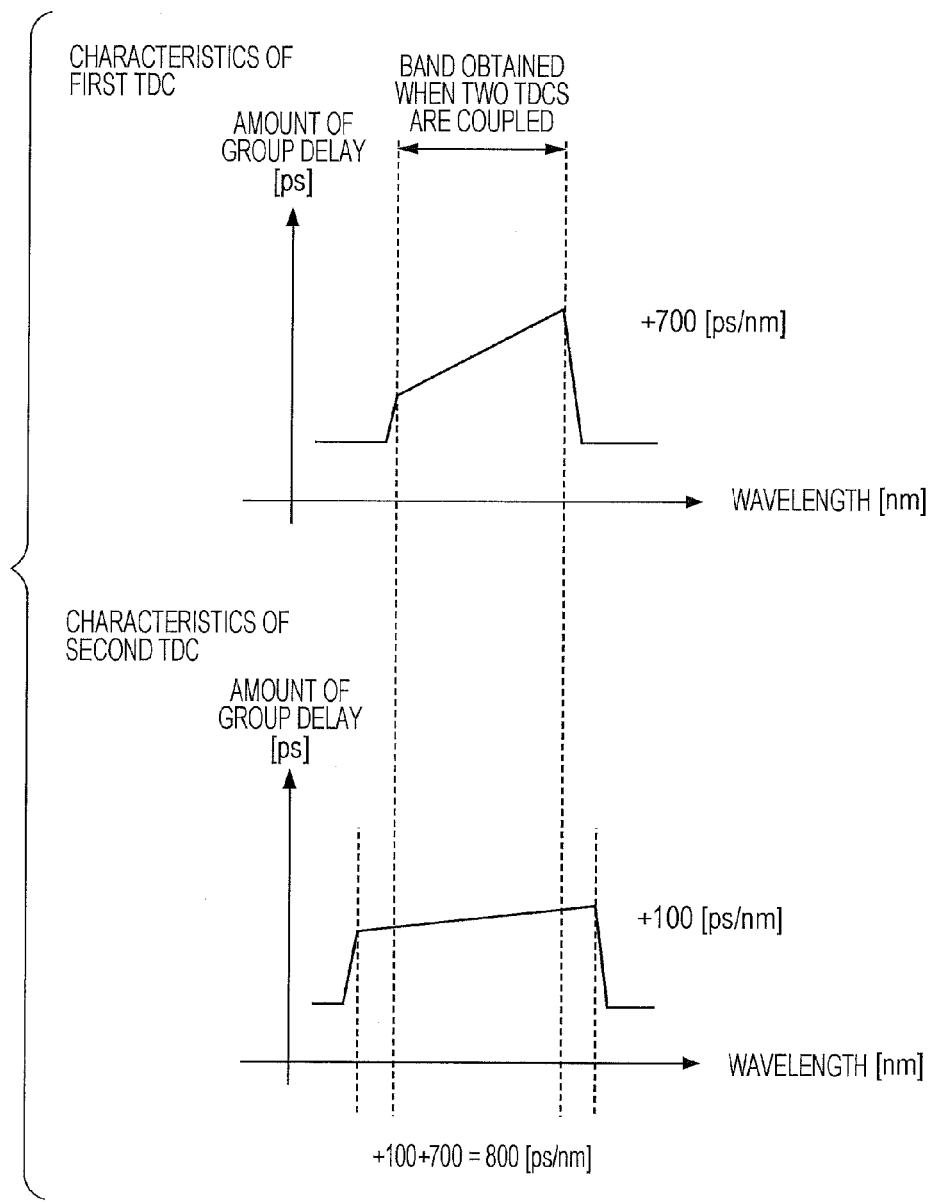
FIG. 5A illustrates a characteristic obtained by a combination of TDCs.
Figure 5B:
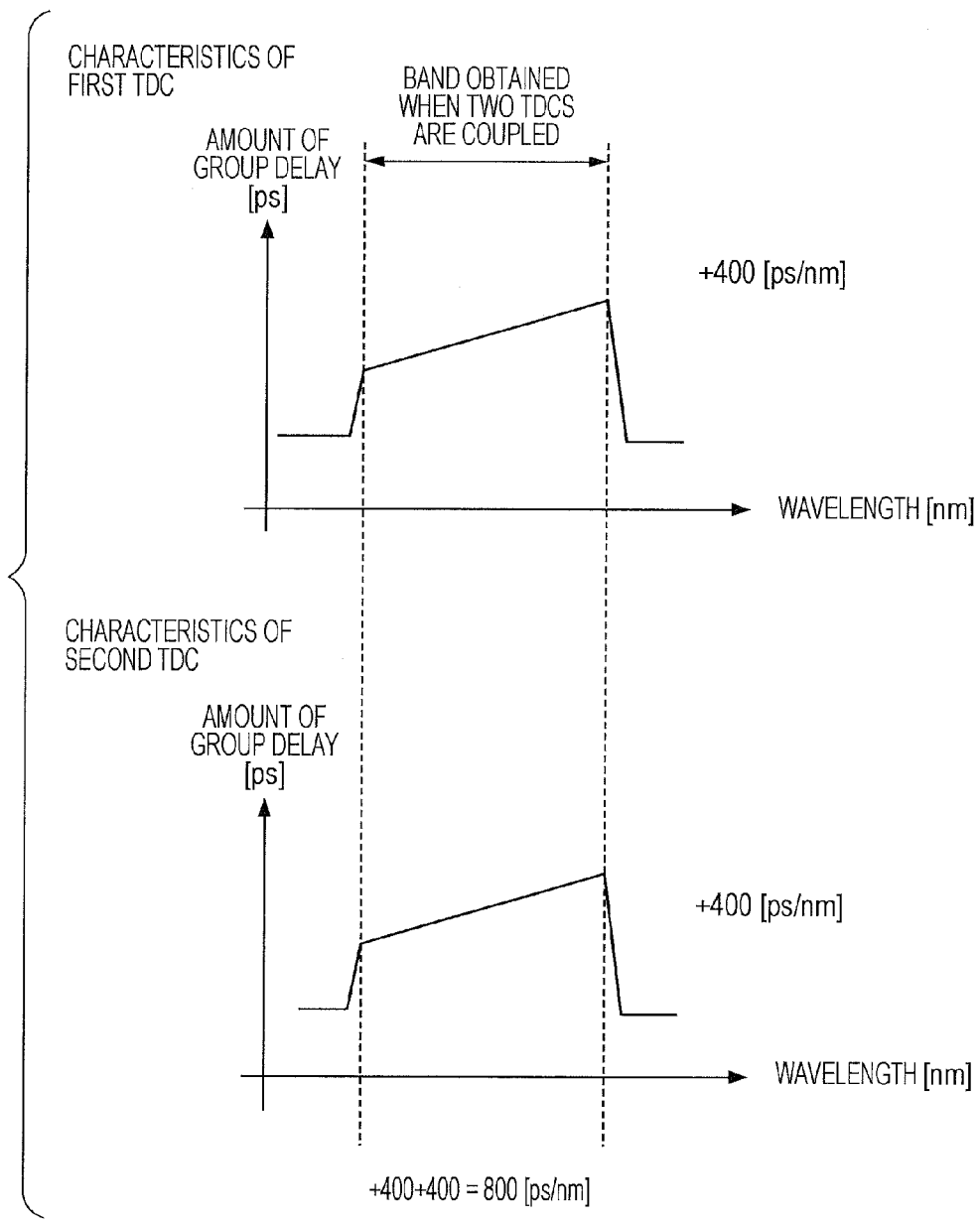
FIG. 5B illustrates a characteristic obtained by a combination of TDCs.
Figure 12A:
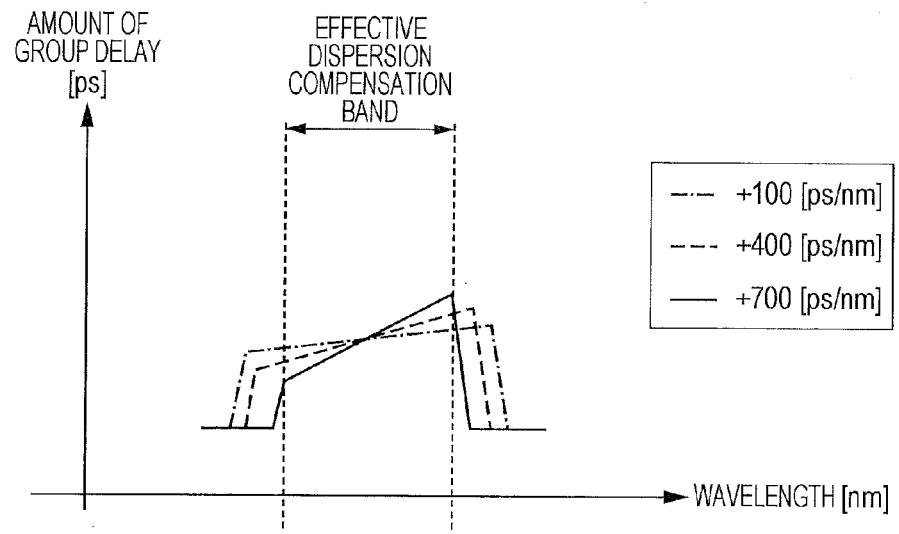
FIGS. 12A and 12B illustrate an example of characteristics of a TDC not having a wavelength characteristic in a transmission band.
Figure 12B:
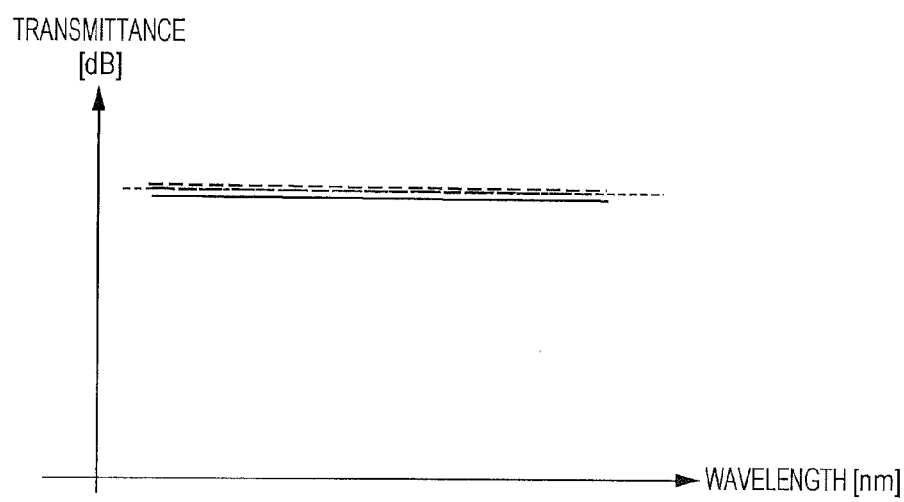

FIGS. 12A and 12B are diagrams illustrating an example of characteristics in the case that the transmission band does not have a wavelength characteristic. In the example of the characteristics of a TDC illustrated in FIGS. 3A and 3B, the transmission band has a characteristic that resembles that of a band-pass filter. When a VIPA, FBG, or PLC tunable dispersion compensator (TDC) is used, the transmission band has the transmission characteristic illustrated in FIG. 3B. However, when the TDC is implemented using another configuration principle, e.g., when an etalon is used in which two reflecting mirrors are arranged in parallel to face each other, the transmission waveform exhibits a substantially flat characteristic over the entire frequency band. In this case, the relationship between the set amount of chromatic dispersion and the transmission band does not have to be used in calculations (only the effective dispersion compensation band is used). Additionally, information on the transmission band does not have to be included in the control table 15. Accordingly, only the relationship between the set amount of chromatic dispersion and the effective dispersion compensation band is included in the DTC control table 15.

Figure 13:
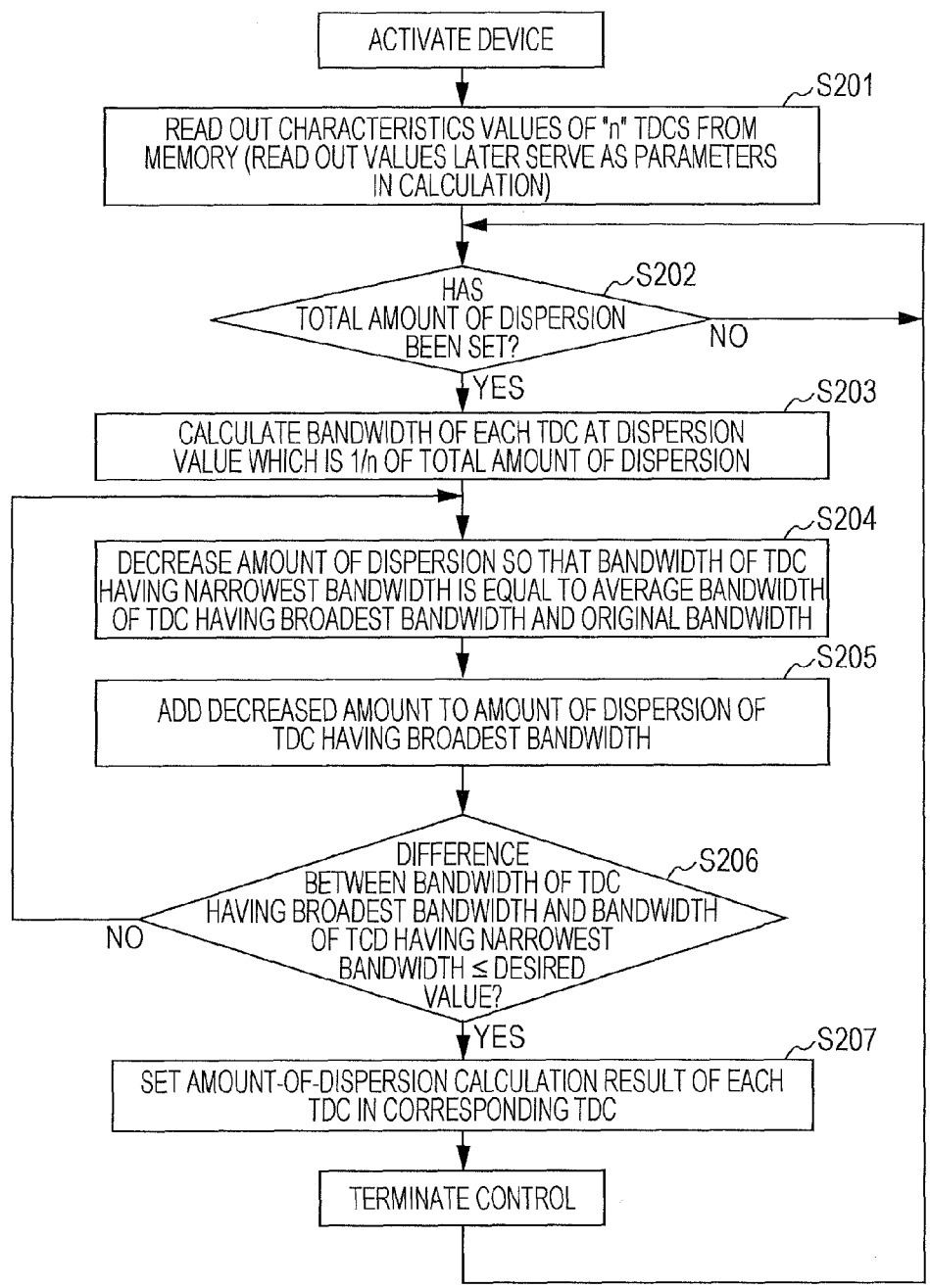
FIG. 13 illustrates a control method performed when "n" TDCs are coupled.

FIG. 13 is a diagram illustrating a processing flow performed when "n" TDCs (n is an integer greater than or equal to 3) are coupled. Even if the number of TDCs is increased, the basic flow is similar to that of the process illustrated in FIG. 8. 1/n of the total dispersion value is distributed to each of the "n" TDCs. Correction is performed so that the bandwidth of a TDC having the narrowest band is increased to the middle or average bandwidth. The decreased amount of dispersion is added to the amount of dispersion of a TDC having the widest band. The process is repeated until a difference between the bandwidths converges within a given value (i.e., until the bandwidths of the "n" TDCs are substantially equal).

Specifically, after activation of the tunable dispersion compensation device 10, the controller 13 reads out values of characteristics of the "n" TDCs from the TDC control table 15 stored in the memory 14 (S201). When the total dispersion value has been set (YES in S202), the bandwidth of each TDC at a dispersion value equal to 1/n of the total dispersion value is calculated (S203). A given interpolation method is used in accordance with the step size of the TDC control table 15 as in FIG. 8.

The bandwidth of the TDC having the narrowest bandwidth is corrected so that the bandwidth is substantially equal to the middle of this bandwidth and the widest bandwidth or the average of bandwidths of the "n" TDCs. A decrease in the amount of dispersion involving this correction is calculated (S204).

The decrease is then added to the amount of dispersion of the TDC having the widest bandwidth, and the adjusted amount of dispersion and the corresponding bandwidth are calculated (S205). Processing in S204 to S206 is repeated until the difference between the bandwidths of the TDC having the widest bandwidth and the TDC having the narrowest bandwidth is smaller than or equal to a given value (YES in S206). After the difference between the bandwidths becomes smaller than or equal to the given value, the calculated dispersion value of each TDC is set in the corresponding TDC (S207). The control then ends.

By using such a control method, the dispersion values balanced between a plurality of coupled TDCs are set in consideration of manufacturing tolerances and characteristic variances of the TDCs so that the TDCs have desirable characteristics. In this way, a wide range of the amount of tunable dispersion may be realized and also a wide bandwidth may be realized.

A device corresponding to the processing flow illustrated in FIG. 13 has a configuration in which three or more TDCs coupled in series in FIG. 7, and the TDC control table 15 includes, for each of the three or more TDCs, the relationship between the amount of dispersion and the effective dispersion compensation band (and also 3-dB band depending on the configuration). Other configuration is the same as that illustrated in FIG. 7.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been illustrated in detail, it should be understood that the various changes, substitutions, and alterations could be made hereto without departing from the spirit and scope of the invention.

What is claimed is:

1. A tunable dispersion compensation device, comprising:
    a plurality of tunable dispersion compensators coupled in series;
    a memory;
    a controller coupled to the memory and configured to control an amount of chromatic dispersion to be set in each of the plurality of tunable dispersion compensators; and
    a table stored in the memory including a correspondence relationship between an amount of chromatic dispersion and a wavelength band, for each of the plurality of tunable dispersion compensators,
    wherein the controller decides the amount of chromatic dispersion to be set in each of the plurality of tunable dispersion compensators, based on a total amount of chromatic dispersion desired for the plurality of tunable dispersion compensators and the correspondence relationship included in the table so that a difference between bandwidths of a first tunable dispersion compensator having the widest wavelength band and a second tunable dispersion compensator having the narrowest wavelength band, among the plurality of tunable dispersion compensators, is controlled by the controller so that the difference approaches near a zero.

2. The tunable dispersion compensation device according to claim 1, wherein the controller
    adjusts the wavelength band of the second tunable dispersion compensator to match an average band of wavelength bands of the plurality of tunable dispersion compensators,
    performs a first calculation in which an amount of chromatic dispersion corresponding to the average band set in the second tunable dispersion compensator is calculated on the basis of the table,
    performs a second calculation in which a change in an amount of chromatic dispersion to be set in the second tunable dispersion compensator which results from the first calculation is added to an amount of chromatic dispersion to be set in the first tunable dispersion compensator,
    performs a third calculation in which a wavelength band corresponding to the amount of chromatic dispersion to be set in the first tunable dispersion compensator which results from the addition is calculated on the basis of the table, and
    determines whether or not the difference between bandwidths of the widest wavelength band and the narrowest wavelength band of the plurality of tunable dispersion compensators after the third calculation approaches near the zero.

3. The tunable dispersion compensation device according to claim 2, wherein the controller performs the first calculation and the third calculation using an interpolation method.

4. The tunable dispersion compensation device according to claim 1, wherein when the total amount of chromatic dispersion is changed, the controller changes the amount of chromatic dispersion to be set in each of the plurality of tunable dispersion compensators with a ratio between the amounts of chromatic dispersion originally set in the plurality of tunable dispersion compensators being maintained.

5. The tunable dispersion compensation device according to claim 1, wherein the table includes a relationship between an amount of chromatic dispersion and an effective dispersion compensation band, for each of the plurality of tunable dispersion compensators.

6. The tunable dispersion compensation device according to claim 1,
    wherein the table includes a relationship among an amount of chromatic dispersion, an effective dispersion compensation band, and a transmission band, for each of the plurality of tunable dispersion compensators, and
    wherein the controller uses, as the wavelength band, narrower one of the effective dispersion compensation band and the transmission band, for each of the plurality of tunable dispersion compensators.

7. The tunable dispersion compensation device according to claim 1, wherein the controller receives the total amount of chromatic dispersion input from the outside.

8. The tunable dispersion compensation device according to claim 1, wherein the controller decides the total amount of chromatic dispersion on the basis of error information included in a reception signal.

9. An optical reception apparatus, comprising:
    a tunable dispersion compensation device including
    a plurality of tunable dispersion compensators coupled in series,
    a memory;
    a controller coupled to the memory and configured to control an amount of chromatic dispersion to be set in each of the plurality of tunable dispersion compensators, and
    a table stored in the memory including a correspondence relationship between an amount of chromatic dispersion and a wavelength band, for each of the plurality of tunable dispersion compensators, wherein the controller decides the amount of chromatic dispersion to be set in each of the plurality of tunable dispersion compensators on the basis of a total amount of chromatic dispersion desired for the plurality of tunable dispersion compensators and the correspondence relationship included in the table so that a difference between bandwidths of a first tunable dispersion compensator having the widest wavelength band and a second tunable dispersion compensator having the narrowest wavelength band, among the plurality of tunable dispersion compensators, is controlled by the controller so that the difference approaches near a zero; and a signal receiver coupled to an output terminal of the tunable dispersion compensation device and including a photoelectric transducer.

10. The optical reception apparatus according to claim 9, wherein the signal receiver includes an error monitor configured to detect an error in a reception signal resulting from photoelectric conversion, wherein a monitoring result obtained by the error monitor is input to the controller of the tunable dispersion compensation device, and wherein the controller sets an optimum total amount of chromatic dispersion on the basis of the monitoring result.

11. A method for controlling tunable dispersion compensation comprising:

acquiring in advance, using a processor, a relationship between an amount of chromatic dispersion and a wavelength band, for each of a plurality of tunable dispersion compensators coupled in series;

acquiring, using the processor, a total amount of chromatic dispersion desired for the plurality of tunable dispersion compensators; and deciding, using the processor, an amount of chromatic dispersion to be set in each of the plurality of tunable dispersion compensators on the basis of the total amount of chromatic dispersion and the relationship acquired in advance so that a difference between bandwidths of a first tunable dispersion compensator having the widest wavelength band and a second tunable dispersion compensator having the narrowest wavelength band, among the plurality of tunable dispersion compensators, is controlled by the controller so that the difference approaches near a zero.

12. The method for controlling tunable dispersion compensation according to claim 11, wherein the deciding an amount of chromatic dispersion includes adjusting the wavelength band of the second tunable dispersion compensator to match an average band of wavelength bands of the plurality of tunable dispersion compensators, performing a first calculation in which an amount of chromatic dispersion corresponding to the average band set in the second tunable dispersion compensator is calculated on the basis of the relationship acquired in advance, performing a second calculation in which a change in the amount of chromatic dispersion to be set in the second tunable dispersion compensator which results from the first calculation is added to an amount of chromatic dispersion to be set in the first tunable dispersion compensator, performing a third calculation in which a wavelength band corresponding to the amount of chromatic dispersion to be set in the first tunable dispersion compensator which results from the addition is calculated on the basis of the relationship acquired in advance, and determining whether or not the difference between bandwidths of the widest wavelength band and the narrowest wavelength band of the plurality of tunable dispersion compensators after the third calculation approaches near the zero.

13. The method for controlling tunable dispersion compensation according to claim 12, wherein the first calculation and the third calculation are performed using an interpolation method.

14. The method for controlling tunable dispersion compensation according to claim 11, further comprising changing the amount of chromatic dispersion to be set in each of the plurality of tunable dispersion compensators with a ratio between the amounts of chromatic dispersion originally set in the plurality of tunable dispersion compensators being maintained, when the total amount of chromatic dispersion is changed.

15. The method for controlling tunable dispersion compensation according to claim 11, wherein the acquiring in advance a relationship includes acquiring in advance a relationship between an amount of chromatic dispersion and an effective dispersion compensation band, for each of the plurality of tunable dispersion compensators.

16. The method for controlling tunable dispersion compensation according to claim 11, wherein the acquiring in advance a relationship includes acquiring in advance a relationship among an amount of chromatic dispersion, an effective dispersion compensation band, and a transmission band, for each of the plurality of tunable dispersion compensators, and wherein narrower one of the effective dispersion compensation band and the transmission band is used as the wavelength band.

17. The method for controlling tunable dispersion compensation according to claim 11, further comprising receiving the total amount of chromatic dispersion input from the outside.

18. The method for controlling tunable dispersion compensation according to claim 11, further comprising deciding the total amount of chromatic dispersion on the basis of error information included in a reception signal.

* * * * *